(12) United States Patent
Bailleul

(10) Patent No.: US 6,731,812 B2
(45) Date of Patent: *May 4, 2004

(54) DATA COMPRESSION

(75) Inventor: Nicolas Bailleul, Paris (FR)

(73) Assignee: Koninklijke Philips Electronics N.V., Eindhoven (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/300,698

(22) Filed: Apr. 27, 1999

(65) Prior Publication Data

US 2003/0043906 A1 Mar. 6, 2003

(30) Foreign Application Priority Data

Apr. 30, 1998 (EP) .............................. 98401053
Jul. 7, 1998 (EP) .............................. 98401721

(51) Int. Cl.⁷ .................................. G06K 9/36
(52) U.S. Cl. ................ 382/239; 382/236; 382/238
(58) Field of Search ................. 382/236, 238, 382/239; 714/752; 375/240.04

(56) References Cited

U.S. PATENT DOCUMENTS 4,144,543 A * 3/1979 Koga .................... 375/240.14
5,491,513 A * 2/1996 Wickstrom et al. ......... 348/390
5,680,483 A   10/1997 Tranchard .................. 382/239
5,959,675 A * 9/1999 Mita et al. ................. 348/405
6,115,420 A * 9/2000 Wang ........................ 375/240
6,298,460 B1 * 10/2001 Sasaki et al. ............... 714/752

FOREIGN PATENT DOCUMENTS

EP     0444918 A2    9/1991    ............ H04N/1/41
EP     0540961 A2    5/1993    ............ H04N/7/13
WO     WO9743859    11/1997    ............ H04N/7/26

* cited by examiner

*Primary Examiner*—Anh Hong Do

(57) ABSTRACT

Data (D) is compressed in dependence on a compression parameter (CPAR). An example of such data compression is coding a sequence of pictures in accordance with a standard defined by the Moving Pictures Experts Group. In the process of compressing the data (D), the following three steps are repetitively carried out. In a prediction step (PRD), it is predicted, on the basis of an initial value (VALint) of the compression parameter (CPAR), which amount of compressed data Xprd will have been obtained at a future instant of time (Tfut). In an adaptation step (ADP), the initial value (VALint) is adapted on the basis of a difference (ΔX) between the predicted amount of data (Xprd) and a desired amount of data (Xdes), so as to obtain an adapted value (VALadp) of the compression parameter (CPAR). In an application step (APL), the adapted value (VALadp) of the compression parameter (CPAR) is applied until a subsequent prediction step (PRD) followed by a subsequent adaptation step (ADP) is carried out. Such data compression yields a better quality in terms of loss of information.

4 Claims, 4 Drawing Sheets

DATA COMPRESSION

FIELD OF THE INVENTION

The invention relates to data compression in dependence on a compression parameter. Such data compression may be applied, for example, in coding a sequence of images in accordance with an image-coding standard defined by the Moving Pictures Experts Group (MPEG).

BACKGROUND ART

U.S. Pat. No. 5,680,483 (attorney's docket PHF 94.510) describes a device for coding a sequence of pictures divided into successive groups of N pictures arranged in blocks. It comprises a channel for quantization and variable length coding of these blocks and a bit rate control sub-assembly. This assembly comprises, in series, a buffer memory and a device for modifying the quantization step. The latter device comprises several stages. A first stage allocates bits for each successive picture of the sequence of pictures. A second stage allocates bits for a current picture and the N−1 subsequent pictures. A third stage corrects the bit allocation for each new picture to be coded. A fourth stage modifies the quantization step as a function of the corrected bit allocation.

SUMMARY OF THE INVENTION

It is an object of the invention to provide data compression which yields a better quality.

The invention takes the following aspects into consideration. It is advantageous to compress data to such an extent that an amount of compressed data is obtained which can just be handled by an entity receiving the compressed data, for example a transmission channel or a storage medium or both. If the data is compressed to a greater extent, there is an unnecessary loss of data because the data-handling capacity of the receiving entity is not used to its full extent. If the data is compressed to a smaller extent, there will also be an unnecessary loss of data because the receiving entity will not be able to handle a certain portion of the compressed data and, consequently, this portion will be lost. Thus, the quality of the data compression, in terms of minimal loss of information, is substantially influenced by a compression parameter determining to which extent the data is compressed.

The background art cited applies the following principle for adjusting a compression parameter in MPEG video coding. At the beginning of a group of pictures, an initial value of the compression parameter is calculated. The initial value of the compression parameter corresponds to the amount of compressed data which should preferably be obtained by compressing the data representing the group of pictures. On the basis of experiences in compressing a previous group of pictures, typical intermediate results are defined in terms of amounts of compressed data. A typical intermediate result is defined for each successive picture in the group. For each picture, the initial compression parameter is adapted on the basis of a difference between the amount of compressed data actually produced thus far and the typical intermediate result. Thus, in the background art, a picture-by-picture compression plan is made at the beginning of the group of pictures, and the compression parameter is adjusted in dependence on a deviation from this plan.

In accordance with the invention, the following steps are repetitively carried out. On the basis of an initial value of the compression parameter, it is predicted which amount of compressed data will have been obtained at a future instant of time. The initial value is adapted on the basis of a difference between the predicted amount of data and a desired amount of data, so as to obtain an adapted value of the compression parameter. The adapted value of the compression parameter is applied until a subsequent prediction step followed by a subsequent adaptation step is carried out.

The invention provides an adjustment of the compression parameter which is directly related to the desired amount of compressed data instead of indirectly as in the background art. As a result, an amount of compressed data will be obtained which is generally closer to the desired amount of compressed data than in the background art. Thus, the invention allows data compression which matches more accurately the data handling capacity of an entity receiving the compressed data. Consequently, the invention yields a better quality in terms of loss of information.

The invention and additional features, which may be optionally used to implement the invention to advantage, are apparent from and will be elucidated with reference to the drawings described hereinafter.

DETAILED DESCRIPTION OF THE DRAWINGS

Figure 1:
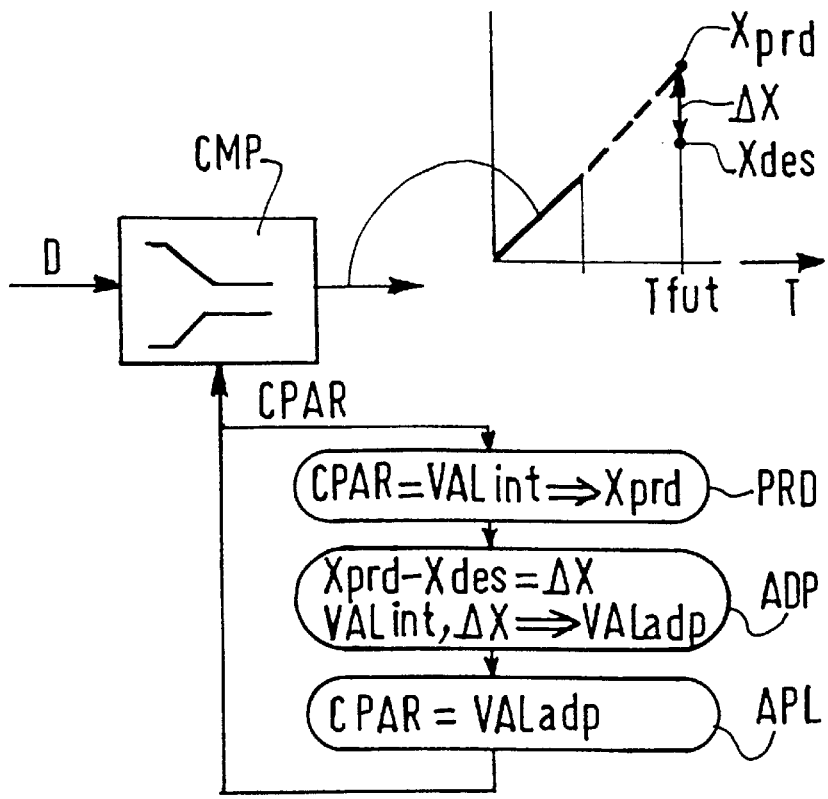
FIG. 1 is a conceptual diagram illustrating basic features of the invention as claimed in claim 1.

First, some remarks will be made on the use of reference signs. Similar entities are denoted by an identical letter code throughout the drawings. In a single drawing, various similar entities may be shown. In that case, a numeral or suffix in small letters is added to the letter code to distinguish similar entities from each other. The numeral or suffix will be between parentheses if the number of similar entities is a running parameter. In the description and the claims, any numeral or suffix in a reference sign may be omitted if this is appropriate. FIG. 1 illustrates basic features of the invention in full lines. Data D is compressed CMP in dependence on a compression parameter CPAR. In the process of compressing the data D, the following three steps are repetitively carried out. In a prediction step PRD, it is predicted, on the basis of an initial value VALint of the compression parameter CPAR, which amount of compressed data Xprd will have been obtained at a future instant of time Tfut. In an adaptation step ADP, the initial value VALint is adapted on the basis of a difference ΔX between predicted the amount of data Xprd and a desired amount of data Xdes, so as to obtain an adapted value VALadp of the compression parameter CPAR. In an application step APL, the adapted value VALadp of the compression parameter CPAR is applied until a next prediction step PRD followed by a subsequent adaptation step ADP is carried out.

To implement the FIG. 1 features to advantage, the following aspects have been taken into consideration. Whenever the three steps PRD, ADP, APL are carried out, the compression parameter CPAR may change in value. It is preferred that the compression parameter CPAR is relatively stable in value. If the compression parameter CPAR nervously jumps up and down in value, this implies that one or more data portions will be compressed to a relatively large extent. Consequently, the compression of these data portions will entail a relatively important loss of information. This will have an adverse effect on the overall quality which will generally be better if the compression parameter CPAR remains close to an average value. That is, the overall quality will generally be better with a series of values of the compression parameter CPAR which is 10, 11, 9, 8, 10, 12 than a series of values 10, 14, 6, 2, 10, 18.

Figure 2:
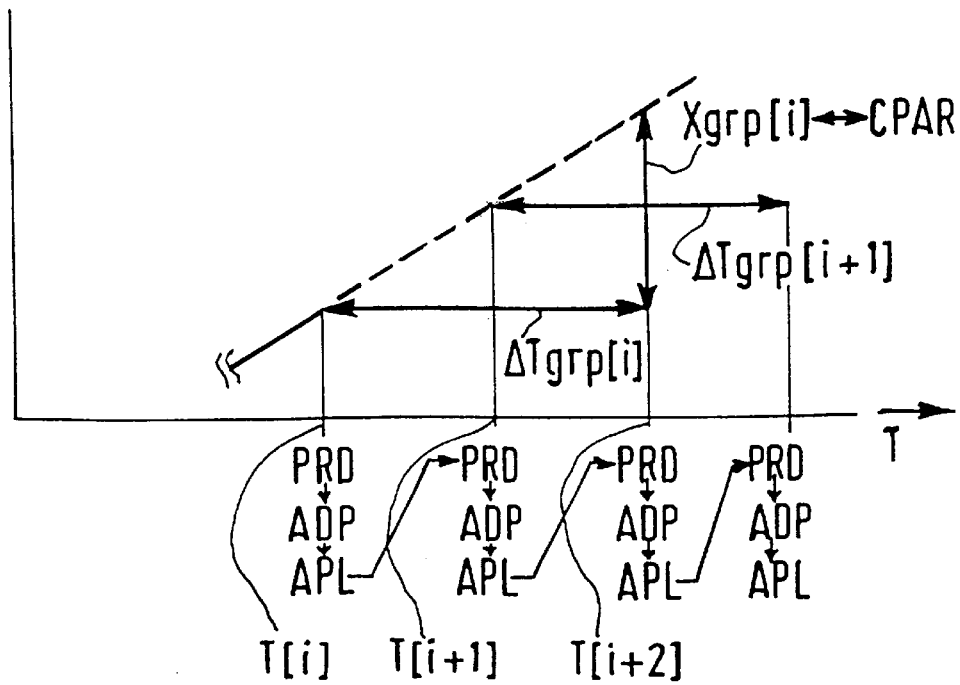
FIGS. 2 and 3 are conceptual diagrams illustrating additional features as claimed in claims 2 and 3, respectively.

FIG. 2 illustrates the following features. The compression parameter CPAR relates to an amount of compressed data Xgrp to be provided over a time interval ΔTgrp in which three steps PRD, ADP, APL will be carried out at least once more.

The FIG. 2 features provide the following advantageous effects. Let it be assumed that the three steps PRD, ADP, APL are carried out at an instant T[i] and that they will be subsequently carried out at instants T[i+1], T[i+2], . . . If the FIG. 2 features are applied, the compression parameter CPAR at the instant T[i] will relate to an amount of data to be provided over a time interval ΔTgrp[i] subsequent to the instant T[i]. Likewise, the compression parameter CPAR at the instant T[i+1] will relate to an amount of data to be provided over a time interval ΔTgrp[i+1] subsequent to the instant T[i+1]. Since these time intervals ΔTgrp[i], ΔTgrp [i+1] substantially overlap, there will be relatively little difference in the amount of data predicted Xprd[i], Xprd[i+1] at the instants T[i], T[i+1]. Consequently, the adapted value VALadp[i+1] at the instant T[i+1] will not differ much from the adapted value VALadp [i] at the instant T[i]. Thus, if the FIG. 2 features are applied, the compression parameter CPAR will be relatively stable in value. Consequently, the FIG. 2 features contribute to a better quality.

To implement the FIG. 1 features to advantage, the following aspects have also been taken into consideration. The data D may comprise one or more portions which are more difficult to compress, as it were, than other portions. That is, if the value of the compression parameter CPAR was fixed, the portions which are difficult to compress would provide a larger amount of compressed data than the other portions. Consequently, a data portion which is difficult to compress will provoke a substantial increase in compressed data. Such a substantial increase may exceed the data-handling capacity of an entity receiving the compressed data which will lead to loss of information. For example, if the receiving entity is a memory, it may overflow when there is a substantial increase in compressed data.

Figure 3:
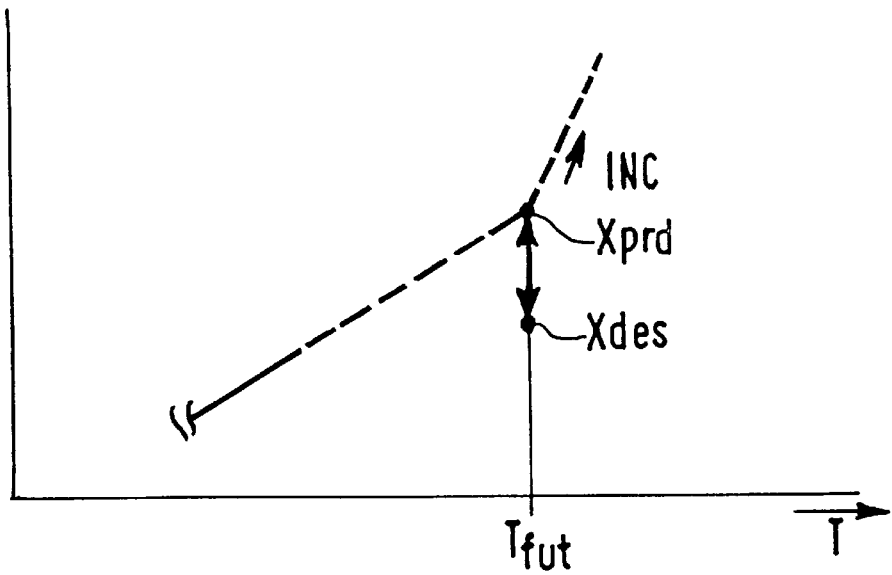

FIG. 3 illustrates the following features. The future instant Tfut lies just before an expected substantial increase INC in compressed data.

The FIG. 3 features provide the following advantageous effects. The amount of compressed data which will have been produced at the future instant Tfut be will relatively close to the desired amount of compressed data Xdes. Since, in accordance with the FIG. 3 features, the future instant Tfut lies just before an expected substantial increase in data, the FIG. 3 features allow the following precautionary measure to prevent loss of information. The desired amount of data Xdes is defined in such a way that there is sufficient room, as it were, in an entity receiving the compressed data for handling a substantial increase in compressed data. For example, if the receiving entity is a memory, the desired amount of data Xdes is defined in such a way that the memory is relatively empty just before the occurrence of a data portion which is difficult to compress. Thus, the FIG. 3 features allow a precautionary measure against loss of information and, consequently, they may contribute to a better quality.

Figure 4:
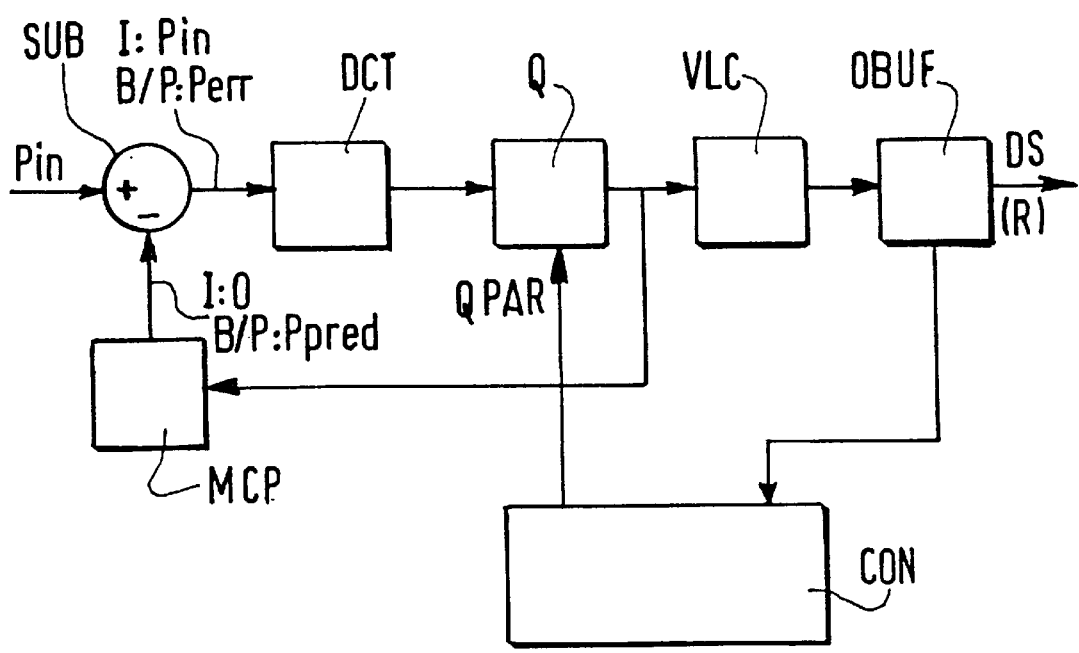
FIG. 4 is a block diagram of an example of an MPEG video coder.

FIG. 4 shows an example of an MPEG video coder in accordance with the invention. It provides an MPEG data stream DS having a bit rate R in response to a sequence of pictures Pin which are divided into blocks of 8 by 8 pixels. The FIG. 4 decoder comprises a motion-compensated predictor MCP, a subtracter SUB, a discrete-cosine transformer DCT, a quantizer Q, a variable-length coder VLC, an output buffer OBUF, and a controller CON.

There are three types of coding in accordance with which a picture Pin may be coded: I-type, P-type and B-type coding. If a picture is I-type coded, the discrete-cosine transformer DCT receives the picture to be coded without any modification. That is, the motion-compensated predictor MCP and subtracter SUB do not affect the coding of an I-type picture. If a picture is P-type coded, the motion-compensated predictor makes a prediction of this picture on the basis of a previous picture as it will be available at the decoding end. If a picture is B-type coded, the motion-compensated predictor makes a prediction on the basis of a previous and a subsequent picture (the B stands for bi-directional) as they will be available at the decoding end. Thus, in the case of P or B-type coding, the motion-compensated predictor MCP provides a predicted picture Ppred. The subtracter subtracts the predicted picture Ppred from the picture Pin to be coded and, accordingly, supplies a prediction-error picture Perr to the discrete-cosine transformer. A picture which is I-type, P-type, or B-type coded will hereinafter be referred to as an I-picture, a P-picture or a B-picture, respectively.

There is a cyclic pattern in the type of coding which is applied for the sequence of pictures P. Each cycle begins with an I-type coding of a picture Pin and is followed by one or more P and B-type codings for subsequent pictures Pin. A cycle covers N pictures, N being an integer. The N pictures covered by a coding cycle are referred to as a group of pictures. Thus, a group of pictures begins with an I-picture and is followed by one or more P-pictures and B-pictures. For example, let it be assumed that N=6, then the group of pictures may comprise the following pictures: I-B-B-P-B-B.

For any type of coding, I, P or B, the following operations are carried out. The discrete-cosine transformer DCT transforms blocks of 8 by 8 pixels into blocks of discrete-cosine transform coefficients. In the case of an I-type coding, the discrete-cosine coefficients directly relate to the picture to be coded, in the case of P or B-type coding, the discrete-cosine coefficients relate to the prediction-error picture. The quantizer Q quantizes the discrete-cosine transform coefficients so as to obtain quantized coefficients. The variable-length coder translates strings of quantized coefficients into code words. The output buffer OBUF temporarily stores the code words and provides an MPEG data stream.

In more detail, the quantizer Q divides each discrete-cosine transform coefficients by a quantization parameter QPAR and rounds off the result of this division to the nearest integer. For example, let it be assumed that a discrete-cosine transform coefficient may have any integral value between −128 and 127. In that case, 8 bits are required to represent the discrete-cosine transform coefficient in a binary form. If the quantization parameter QPAR has a value of 4, a quantized discrete-cosine transform coefficient will be obtained which may have any integral value between −32 and 31. In that case, only 6 bits are required to represent the quantized discrete-cosine coefficient. However, if the quantization parameter has a value of 8, a quantized discrete-cosine transform coefficient will be obtained which has any integral value between −16 and 15. In that case, only 5 bits are required to represent the quantized DCT coefficient.

The quantization parameter QPAR determines to a relatively large extent which picture quality can be obtained at the decoding end. If a picture is coded with the quantization parameter QPAR having a relatively large value, the quantized coefficients will comprise a relatively small number of bits and, consequently, the picture will have a relatively poor resolution. If, in contrast, a picture is coded with the quantization parameter QPAR having a relatively small value, the quantized coefficients will comprise a relatively large number of bits and, consequently, the picture will have a relatively good resolution.

However, with regard to the quantization parameter QPAR, the following constraint has to be observed. The coding of a picture Pin should, on average, produce a number of bits which equals the bit rate R of the MPEG data stream divided by the picture period Tp. Due to the presence of the output buffer OBUF and an input buffer at the decoding end, the coding of a particular picture may produce a larger or smaller number of bits than the average. That is, these buffers provide some margin to momentarily deviate from the average. The amount of margin is limited by the respective buffer sizes. If the deviation from the average is too large, the input buffer at the coding end may underflow or overflow. In that case, one or more pictures will be incomplete or may even be fully lost. It goes without saying that this will have a relatively large impact on the overall quality.

Thus, in view of what is stated above, the quantization parameter QPAR is preferably controlled on the basis of the following strategy. The quantization parameter QPAR is given a value which is as low as possible while avoiding underflow or overflow of an input buffer at the decoding end. In this respect, it should also be noted that the quantization parameter should preferably have a value which does not substantially change from one picture to the other. If the latter happens, the picture with the highest quantization parameter (lowest resolution) will have a relatively great influence on the overall picture quality. Thus, it is better to have a quantization parameter QPAR which is substantially constant in value than one whose value jumps up and down.

There is a basic aspect in adjusting the quantization parameter QPAR. For any type of coding, I, P or B, it is not possible to determine in advance which number of bits will be obtained with a given value of the quantization parameter QPAR. This is because, for any type of picture I, B or P, there is no fixed relation between the number of bits it comprises and the quantization parameter which has been used to obtain it. The number of bits comprised in a P or B-picture depends on how well the motion-compensated predictor MCP predicts the picture Pin to be coded. Furthermore, in variable-length coding there is, by definition, no fixed relation between the number of bits comprised in input data and output codes. The number of bits comprised in the output codes depends on the content of the input data which, in MPEG video coding, is determined by the content of the picture Pin to be coded.

Figure 5:
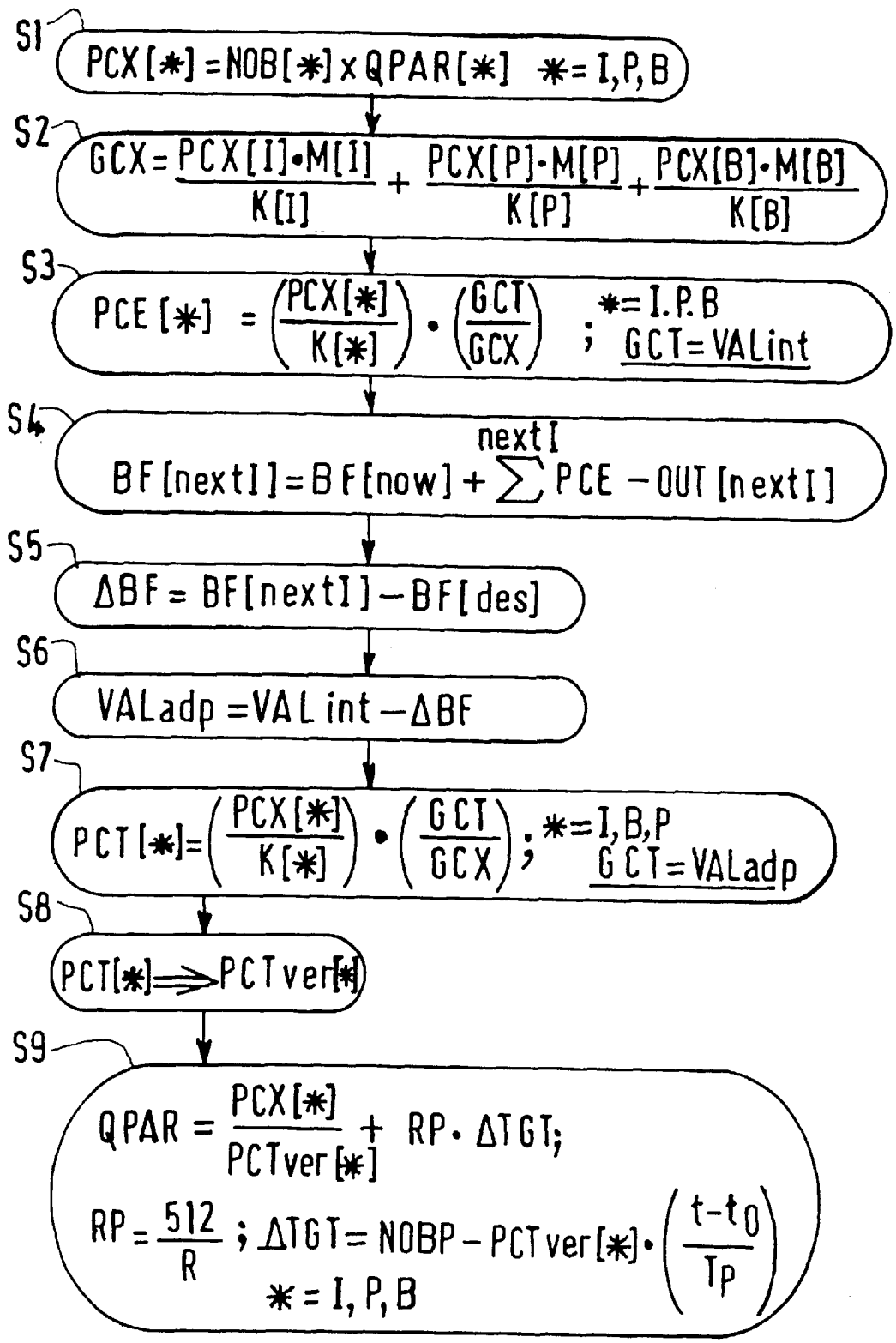
FIG. 5 is a flow chart illustrating a method of video coding in accordance with the invention.

FIG. 5 illustrates an example of a method of adjusting the quantization parameter QPAP in the FIG. 4 MPEG video coder. The method recaptures the FIGS. 1–3 characteristics and is carried out by the controller CON which may be in the form of a suitably programmed computer. The method comprises a plurality of steps S1–S9 which are carried out before the coding of a picture begins. The steps S1–S9 are also preferably carried out before the coding of a new slice within a picture.

In a step S1, a picture complexity PCX is calculated for each type of picture I, P and B. Each picture complexity PCX is a product of the number of bits NOB produced by a recent coding and the quantization parameter QPAR used in the recent coding. Each picture complexity PCX is in fact a past coding experience for the type of coding concerned. It can be used to predict for a certain value of the quantization parameter QPAR, which number of output bits will be obtained if a subsequent picture is coded. The picture complexity PCX for the type coding to be used may be divided by the value of the quantization parameter QPAR. The outcome of this division is a prediction, based on the past coding experience, of the number of output bits which will be obtained.

In a step S2, a group-of-pictures complexity GCX is calculated. The group-of-pictures complexity GCX is the sum of three terms. Each term relates to a different picture type and is the picture complexity PCX of the type concerned, multiplied by the number M of pictures of the type concerned within a group of pictures, and divided by a weighing factor K for the type concerned. The group-of-pictures complexity GCX is also in fact a past coding experience, broader than the picture complexity PCX, which can be used to calculate a value for the quantization parameter QPAR. For example, the group-of-pictures complexity GCX may be divided by a desired number of output bits to be obtained for N subsequent pictures. Accordingly, a value for the quantization parameter QPAR is obtained with which, based on past coding experience, the coding of the N subsequent pictures should produce the desired number of bits. The latter, however, need not be so.

In a step S3, a picture-coding estimation PCE is calculated for each type of picture I, P and B. The picture-coding estimation PCE is the product of a first and a second term. The first term is the picture complexity PCX of the type concerned, divided by the weighing factor K of the type concerned. The second term is an initial value VALint for a group-coding target GCT, divided by the group-of-pictures complexity GCX calculated in step S2. The group-coding target GCT is the number of bits which should be obtained by coding the current picture and the N−1 subsequent pictures. The initial value VALint for the group-coding target GCT is the number of bits which will be outputted from the output buffer OBUF during a period covering the current picture and the N−1 subsequent pictures. Thus, the picture-coding estimation PCE is based on the following target: the amount of data which goes into the output buffer OBUF should equal the amount of data which is removed from the output buffer OBUF during the period concerned. The second term of the picture-coding estimation PCE represents a value for the quantization parameter QPAR with which, based on past coding experience, this target should be achieved.

In a step S4, a predicted buffer fullness BF[nextI] at the next I-picture is calculated. The predicted buffer fullness BF[nextI] is based on the initial value VALint for the group-coding target GCT and the picture-coding estimation PCE derived therefrom. The predicted buffer fullness BF[nextI] is the current fullness BF[now] of the output buffer plus a sum Σ of picture-coding estimations which comprises a picture-coding estimation PCE for each picture until the next I-picture, minus the number of bits OUT [nextI] which will be outputted from the output buffer until the next I-picture.

In a step S5, a buffer fullness surplus ΔBF is calculated. The buffer fullness surplus ΔBF is the difference between the predicted buffer fullness BF[nextI] and a desired buffer fullness BF[des] at the next I picture. The desired buffer fullness BF[des] is preferably defined in such a manner that it corresponds to an input buffer at the decoding end being substantially filled with data just before decoding the I picture.

In a step S6, an adapted value VALadp for the group-coding target GCT is calculated. The adapted value VALadp for the group coding-target GCT is the initial value VALint for the group-coding target GCT, which is the number of bits which will be outputted from the output buffer during a period covering the current picture and the subsequent N−1 pictures, minus the buffer fullness surplus ΔBF.

In a step S7, a picture-coding target PCT is calculated for coding the current picture. The picture-coding target PCT is based on the adapted value VALadp of the group-coding target GCT in the same manner as the picture-coding estimation PCE is based on the initial value VALint of the group coding-target GCT. The picture-coding target PCT is a product of a first term and a second term. The first term is the picture complexity PCX belonging to the type of the picture to be coded, I, B or P, divided by the weighing factor K used for that type. The second term is the adapted value VALadp for the group-coding target GCT divided by the group-of-pictures complexity GCX.

In a step S8, the picture-coding target PCT is verified so as to obtain a verified picture-coding target PCTver. In this step, it is checked whether or not underflow or overflow will occur at the decoding end if the coding of the current picture produces a number of bits which is equal to the picture-coding target PCT. If there is neither underflow nor overflow, the verified picture-coding target PCTver will equal the picture-coding target PCT, that is, the picture-coding target PCT is not changed. If, however, the picture-coding target PCT lead to underflow or overflow, the picture-coding target PCT is effectively clipped in replacing it by a value which prevents underflow or overflow.

In a step S9, a value for the quantization parameter QPAR is calculated. The value is the sum of a first term and a second term. The first term is the picture complexity PCX of the type concerned, divided by the verified picture-coding target PCTver. The second term is the product of a deviation-from-target ΔTGT and a reaction parameter RP. The deviation-from-target ΔTGT is the number of bits NOBP produced thus far by coding the current picture, minus the verified picture-coding target PCT multiplied by times the ratio of the time lapsed thus far t−t0 in coding the current picture, and the picture period Tp. The reaction parameter RP is 512 divided by the bit rate R of the MPEG data stream DS.

With regard to the value for the quantization parameter QPAR, the following is noted. The first term is a global or long-term strategy for adjusting the quantization parameter QPAR. Let it be assumed that the picture-coding target is not clipped, meaning that the verified picture-coding target PCTver equals the picture-coding target PCT. In that case, the first term corresponds to the weighing factor K for the picture concerned multiplied by the group-of-pictures complexity GCX and divided by the adapted value VALadp of the group-coding target GCT. The group-of-pictures complexity GCX consists of a sum of products of "the number of bits actually produced in the recent past" and "the quantization parameter which was applied". Thus, the first term effectively represents a value for the quantization parameter QPAR which, based on past experience, is expected to result in a number of desired bits. The second term is a local or short-term strategy for adjusting the quantization parameter QPAR. It is a kind of safety measure which prevents the coding from producing a number of bits which deviates to a relatively large extent from the targeted number of bits being the verified picture-coding target PCTver.

Figure 6:
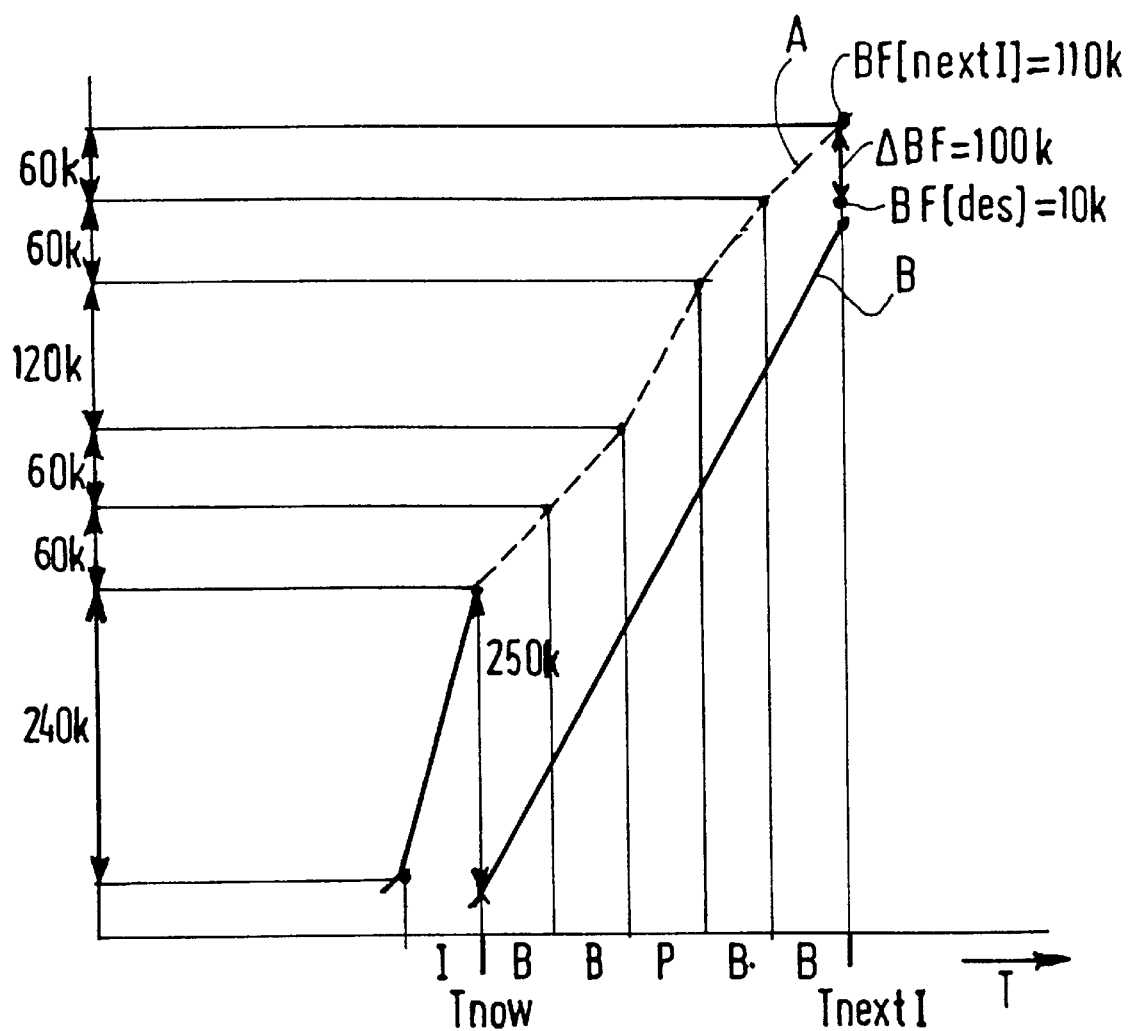
FIG. 6 is a graph illustrating a condition which may occur during video coding in accordance with the FIG. 5 method.

FIG. 6 illustrates an example of the FIG. 5 method. FIG. 6 is a graph in which the horizontal axis represents time and the vertical axis represents amount of data, that is, the number of bits. FIG. 6 comprises a curve A and a curve B. Curve A represents the number of bits written into the output buffer OBUF of the FIG. 4 MPEG video coder. Curve B represents the number of bits read from the output buffer OBUF, thus forming the MPEG data stream DS. Consequently, curve B has a slope which corresponds to the bit rate R of the MPEG data stream DS. The difference between curve A and curve B at a certain instant time corresponds to the fullness of the output buffer OBUF at that instant. Plotted on the horizontal axis is a marker Tnow which represents the current time, and a marker TnextI which represents the occurrence of the next I-picture having regard to the current time Tnow. The current time Tnow corresponds to the beginning of the coding of the first B-picture in a group of pictures.

In the FIG. 6 example, the following assumptions have been made. The group of pictures comprises 6 pictures, n=6, of the following types: I, B, B, P, B, B. The coding of the most recent I, P and B-picture produced 240 k, 120 k, and 60 k bits. For each of these pictures, the quantization parameter QPAR had a value of 5. The fullness of the output buffer at the instant Tnow is 250 k bit. The desired buffer fullness BF[des] at the next I picture is 10 k bit, that is, the buffer should be nearly empty. The bit rate R of the MPEG data stream DS is 5M bit/s and the picture period is 20 ms. Consequently, the number of bits which will be outputted from the output buffer during a period covering N pictures is 5M bits/s×20 ms×6=600 k bits. Thus, the initial value VALint for the group-coding target GCT is 600 k. The weighing factor K for each type of picture is 1, thus the weighing factor is effectively ignored for simplicity's sake.

The step S1 provides the picture complexity PCX[I], PCX[P] and PCX[B] for the I, P and B-pictures which is 1200 k, 600 k and 300 k, respectively. The step S2 provides the group-of-pictures complexity GCX which is 1200 k+600 k+4×300 k=3000 k. The step S3 provides the typical number of bits for the I-, P- and B-pictures which is 1200 k·×{600 k/3000 k}=240 k, 600 k·×{600 k/3000 k}=120 k, 300 k·×{600 k/3000 k}=60 k. The step S4 provides the predicted buffer fullness BF[nextI] which is 200 k (the actual buffer fullness)+4 ×60 k (four B-pictures to go)+120 k (one P-picture to go)−{5 M×5×20 ms}=250 k+240 k +120 k−500 k=110 k bits. The step S5 provides the buffer fullness surplus ΔBF which is 110 k−10 k=100 k bits. The step S6 provides the adapted value VALadp for the group-coding target GCT which is 600 k−100 k=500 k. The step S7 provides the picture-coding target PCT for coding the current B-picture which is 300 k×{500 k/3000 k}=50 k bit. The step S8 does not clip the picture-coding target PCT so that the verified picture-coding target PCTver is 50 k bit. The step S9 provides the value for the quantization parameter which is 300 k/50 k=6. The previously mentioned second term does not play a role yet because it has been assumed that the coding of the current B-picture is just about to begin.

As mentioned hereinbefore, the FIG. 5 method includes the FIGS. 1–3 characteristics. With regard to the FIG. 1 characteristics, the following remarks are made. In the FIG. 5 method, pictures, which constitute data, are compressed in dependence on a group-coding target GCT which constitutes a compression parameter. In the step S4, the buffer fullness BF[nextI] at the next I-picture is predicted on the basis of the initial value VALint of the group-coding target GCT. This corresponds to predicting which amount of compressed data will have been produced at a future instant. In the step S5, the buffer surplus ΔBF corresponds to the difference between the amount of compressed data which has been predicted and a desired amount of compressed data. In the step S6, the adapted value VALadp for the group-coding target is obtained by adapting the initial value VALint of the group-coding target GCT on the basis of the buffer surplus ΔBF. In the step S7, the adapted value VALadp for the group-coding target GCT is used to calculate the picture-coding target which, after an optional verification, determines the quantization parameter QPAR.

With regard to the FIG. 5 method including the FIG. 2 characteristics, the following remarks are made. The FIG. 5 method, which includes the three steps PRD, ADP, APL illustrated in FIG. 1, is carried out before the coding of each picture. In the FIG. 5 method, the group-coding target GCT constitutes the compression parameter which is adapted. The group-coding target relates to an amount of data which should be obtained by coding the current picture and the N−1 subsequent pictures. Thus, in the FIG. 5 method, the compression parameter relates to an amount of data to be provided over a time interval in which the three steps PRD, ADP, APL are carried out at least once more.

With regard to the FIG. 5 method including the FIG. 3 characteristics, the following remarks are made. In the FIG. 5 method, the buffer fullness BF[next I] at the next I-picture is predicted. This corresponds to predicting which amount of compressed data will have been obtained until the next I-picture being of time. The coding of an I-picture generally produces more bits than the coding of a P or B-picture. Thus, the future instant for which the prediction is made, lies just before an expected substantial increase in compressed data.

The drawings and their description hereinbefore illustrate rather than limit the invention. It will be evident that there are numerous alternatives which fall within the scope of the appended claims. In this respect, the following closing remarks are made.

There are numerous ways of physically spreading functions or functional elements over various units. In this respect, the drawings are very diagrammatic, each representing only one possible embodiment of the invention. Thus, although a drawing shows different functional elements as different blocks, this by no means excludes the implementation of some functional elements or all functional elements as a single physical unit.

The FIG. 5 method may also be applied in an MPEG video transcoder which can functionally be regarded as a combination of an MPEG video decoder and an MPEG video encoder coupled in series.

Any reference sign in a claim shall not be construed as limiting the claim concerned.

What is claimed is:

1. A method of compressing data in dependence on a compression parameter (CPAR), the following steps are repetitively carried out:

predicting (PRD), on the basis of an initial value (VALint) of the compression parameter (CPAR), which amount of compressed data (Xprd) will have been obtained at a future instant of time (Tfut) just before an expected substantial increase (INC) in compressed data;

adapting (ADP) the initial value (VALint) on the basis of a difference (ΔX) between the predicted amount of data (Xprd) and a desired amount of data (Xdes), so as to obtain an adapted value (VALadp) of the compression parameter (CPAR);

applying (APL) the adapted value (VALadp) of the compression parameter (CPAR) until a subsequent prediction step followed by a subsequent adaptation step is carried out.

2. A method of processing data as claimed in claim 1, wherein the compression parameter (CPAR) relates to an amount of compressed data (Xgrp) to be provided over a time interval (ΔTgrp) in which three steps (PRD, ADP, APL) will be carried out at least once more.

3. A computer program product for use in a data compressor, the computer program product comprising a set of instructions for carrying out the method as claimed in claim 1.

4. A data compressor, comprising:

a transformer for transforming data into transform coefficients;

a quantizer for dividing the transform coefficients by an adapted value (VALadp) of a compression parameter (CPAR);

a controller (CON) for predicting (PRD), on the basis of an initial value (VALint) of the compression parameter (CPAR), which amount of compressed data (Xprd) will have been obtained at a future instant of time (Tfut) just before an expected substantial increase (INC) in compressed data, adapting (ADP) the initial value (VALint) on the basis of a difference (ΔX) between the predicted amount of data (Xprd) and a desired amount of data (Xdes), so as to obtained the adapted value (VALadp) of the compression parameter (CPAR).

* * * * *